March 13, 1934.   G. FLINTERMANN   1,951,013
SHOCK ABSORBING DEVICE
Filed Sept. 20, 1929   2 Sheets-Sheet 1

INVENTOR
Gerhard Flintermann
BY
Pennie, Davis, Marvin & Edmonds
ATTORNEYS

March 13, 1934. G. FLINTERMANN 1,951,013
SHOCK ABSORBING DEVICE
Filed Sept. 20, 1929  2 Sheets-Sheet 2
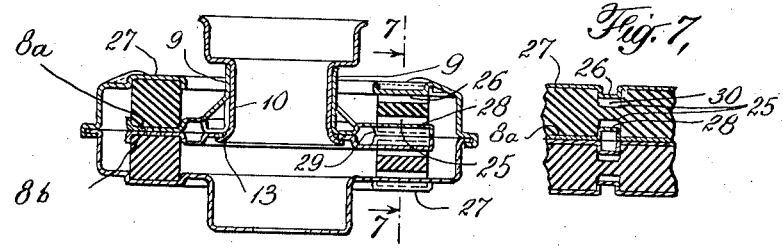

Patented Mar. 13, 1934

1,951,013

UNITED STATES PATENT OFFICE 1,951,013

SHOCK ABSORBING DEVICE

Gerhard Flintermann, West Orange, N. J.

Application September 20, 1929, Serial No. 394,124

8 Claims. (Cl. 248—16)

This invention relates to devices capable of being interposed between two objects or parts thereof, for absorbing shocks, for deadening the transmission of sounds, for permitting a limited relative movement between the two members while at the same time resiliently opposing such movement, and various other purposes.

The principal object of the invention is to provide such a device which is so constructed that it can be manufactured in large numbers at a very low cost, which is so designed that it is capable of many different uses and applications and in which there is a new and beneficial cooperative relationship between the elements composing the device.

The invention is illustrated in the accompanying drawings, in which

Figs. 4 and 5 are perspective views showing modifications of the resilient ring employed in the device;

Fig. 6 is a vertical section of a modified form of the device.

Fig. 7 is a vertical section taken on the line 7—7 of Fig. 6, and

Fig. 8 is a perspective view of the resilient ring employed in Fig. 6.

Figure 1:
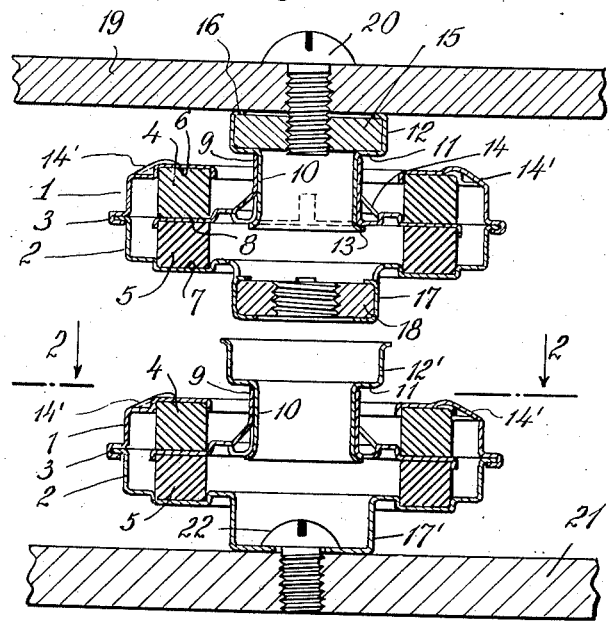
Fig. 1 is a vertical section through two of the devices showing how they may be used jointly as a resilient connection or shock-absorbing medium between two members.
Figure 2:
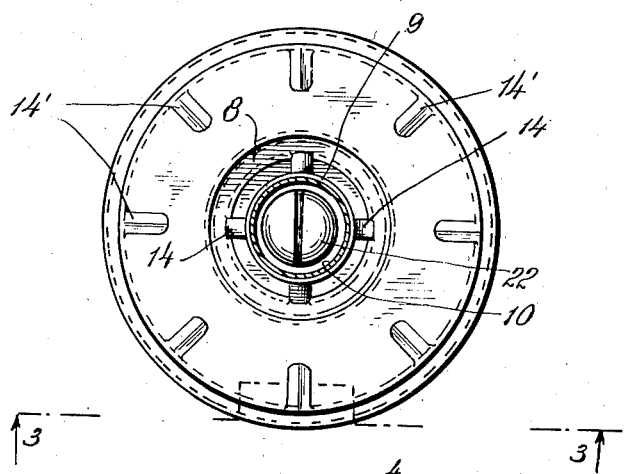
Fig. 2 is a horizontal section taken on the line 2—2 of Fig. 1.
Figure 3:
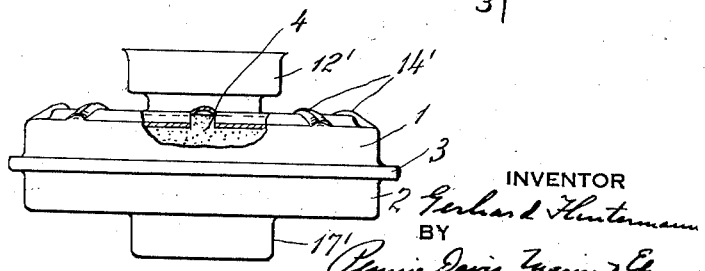
Fig. 3 is a vertical section taken on the line 3—3 of Fig. 2.

The device shown in the upper part of Fig. 1 comprises a pair of sheet metal annular members 1 and 2 which are crimped together at 3. They confine between them superposed rings 4 and 5 of non-metallic resilient material such as rubber. The upper member 1 has a channel 6 to accommodate the upper edge portion of the upper resilient ring 4 and the lower member 2 has a similar channel 7 to accommodate the lower edge portion of the lower ring 5. The metal at the outer corner of either or both of the members 1 and 2 may be pressed to form a number of spaced, radially extending ridges 14' to reinforce the corner and to provide greater strength.

When the device is assembled the two resilient rings 4 and 5 are placed between the metal members 1 and 2 and a disc-like metal member 8 is positioned between the rings. The members 1 and 2 are then crimped together so that the rings 4 and 5 are maintained under compression.

The disc 8 has an axially extending tubular portion 9 which receives a tubular portion 10 of the fastening element. The upper end of the tubular portion 10 is flared outwardly to form a shoulder 11 and a pocket 12. The lower edge of the tubular portion 10 is turned outwardly as shown at 13 to lock the tubular portion within the outer tubular part 9. The corner formed at the junction of the disc 8 and tubular part 9 may have spaced radially extending ridges 14 similar to those shown at 14' to reinforce and strengthen this corner.

The pocket 12 contains a nut 15 held in place by crimping over the upper edge of the pocket as shown at 16.

The lower member 2 has a depending pocket 17 which houses a similar nut 18.

The device may be used by fastening the nut 15 to one of the members 19 between which the device is to be interposed as by means of a screw 20 and the lower nut 18 may be similarly attached to the other member 21. However in Fig. 1 there is shown a second device for attachment to the second member 21 and the two devices are so designed as to fit together. The second device may be similar in all respects to the one described above except that the upper pocket 12' contains no nut and is made large enough to serve as a socket to receive the pocket portion 17 with a tight fit. The pocket portion 17 then serves as a plug. The lower device shown in Fig. 1 also departs from the construction of the upper device in that the lower pocket portion 17' contains no nut although it may contain one if desired in which event it would be attached to the member 21 in the same way that the nut 15 is attached to its member 19. When no nut is used in the pocket portion 17' it may be fastened to the member 21 by a screw 22. This screw may be inserted into the interior of the device in such a way that the head is located within the pocket 17' and the screw may be turned by a screw-driver inserted axially into the interior of the device. This method of fastening is well adapted for use with a member of that kind where the screw cannot be applied in the manner in which the screw 20 is applied to its member 19. When the upper and lower devices are forced together so that the plug 17 fits into the socket 12' they jointly form a resilient connection between the members 19 and 21. Any desired number of the devices may be superposed in a similar manner to furnish any desired amount of resiliency.

When there is relative movement between the inner member, (formed by the parts 10, 12 and disc 8) and the outer member (formed by the parts 1 and 2) the disc 8 compresses either the ring 4 or the ring 5. The force on the rings is applied at right angles to the plane of the rings and all of the material of the rings, lying as it does entirely between the disc 8 and the bottom of the channels 6 and 7 is placed under direct compression when the parts move relative to each other, as distinguished from a bending or shearing action. A minimum amount of rubber may therefore be employed and it will oppose considerable loads.

Figs. 4 and 5 show how the rings 1 and 2 may be shaped if desired to allow the rubber to flow more readily. In Fig. 4 the rubber is provided with recesses 23 extending partly through the ring to allow the rubber to flow and in Fig. 5 openings 24 pass through the ring for a similar purpose. The rings may be shaped in various other ways to accomplish this purpose.

The modification of Figs. 6 and 7 is designed for use with rubber rings of the kind shown in Fig. 8. Each ring has radially extending recesses 25 on its upper and lower surfaces and the webs forming the bottoms of the channels 6 and 7 of the outer member and also the disc portion of the inner member are provided with corresponding ridges to engage in the recesses 25 of the rubber rings as shown in Figs. 6 and 7. For this purpose the channels 6 and 7 may be so formed as to provide radial ridges 26 and depressions 27. The disc portion of the inner member in this case is preferably made composite and comprises a disc 8a carried integrally with the tubular portion 9 as before and a second disc 8b held flat against the first disc by the turned over lower edge 13 of the tubular portion 10. The disc 8a is provided with ridges and depressions 28 and 29 to fit the recesses and projections on the lower surface of the upper ring and the disc 8b is provided with similar ridges and depressions to fit the recesses and projections on the upper surface of the lower ring. In this way relative twisting or relative axial rotary movement between the inner and outer members, as well as rotary movement of the rings relative to the metal members is prevented. The recesses 25 in the rubber ring may be deeper than the ridges on the metal members so as to leave clearances 30 into which the rubber may flow when it is compressed during operation of the device.

It will now be seen that the device is extremely simple in construction. The holding members for the resilient rings may be pressed or drawn from thin sheet metal, and the device can be manufactured in large numbers at small cost. It is very flexible as to its uses as it can be used in connection with typewriters, motors, radio sets and loudspeakers and any other object where it is desired to absorb shocks between the object and the article on which it is supported or between parts of the object itself. It may also be used to permit a small relative movement between two objects or parts of one object, the movement being resiliently opposed by the rubber rings. While the device may be made in any desired size depending upon the use for which it is intended I have found that a convenient size, allowing a large number of varied uses, is about the size of a quarter or half dollar.

I claim:

1. A device of the kind described comprising a pair of superposed rings of resilient material, a metal member having a part overlying the upper surface of the upper ring and a part overlying the lower surface of the lower ring and a connecting part lying in spaced relation to the outer edges of said rings, and a second metal member having a portion clamped between the adjacent faces of the rings, said last named portion being the sole means of attachment of the second member to the resilient rings.

2. A device of the kind described comprising a pair of superposed rings of resilient material, an outer metal member having a part overlying the upper surface of the upper ring and a part overlying the lower surface of the lower ring said outer member being spaced from the outer edges of said rings, and an inner metal member having a portion extending axially into the openings of said rings and a radially extending portion clamped between the adjacent surfaces of the rings, said radially extending portion being the sole means of attachment of the inner member to the resilient rings.

3. A device of the kind described comprising a pair of superposed resilient rings, a pair of members movable relative to each other in a direction axially of said rings, one of said members having a radially extending portion overlying the upper surface of the upper ring, a radially extending portion overlying the lower surface of the lower ring and an axially extending portion surrounding and spaced from the outer edges of both rings, and the other member having an axially extending portion within and spaced from the inner edges of said rings and a radially extending portion clamped between the two adjacent faces of the rings and overlapping the radially extending portions on the other member, all parts of the resilient rings being disposed between the overlapping portions of the two members whereby relative axial movement between the members places all parts of one of the resilient rings under compression.

4. A device of the kind described comprising a pair of superposed resilient rings, a member having radially extending portions overlying the upper surface of the upper ring and the lower surface of the lower ring and having an axially extending portion connecting said radially extending portions and surrounding and spaced from the outer edges of said rings, and a second member having a radially extending portion disposed between the adjacent faces of the rings and overlapping the radially extending portions on the first member, no parts of the resilient rings extending radially beyond the overlapping portions of said members whereby relative movement between the members in a direction axially of the rings places all parts of one of the rings under compression.

5. A vibration insulator comprising a casing formed with an opening in one end thereof, a damping element clamped between opposite end faces of the casing, but spaced laterally from the casing and a supporting element anchored in the damping element and projecting through said opening.

6. A vibration insulator comprising a casing formed with an opening in one end thereof, a damping element clamped between opposite end faces of the casing but spaced laterally from the casing, and a supporting element anchored in the damping element and projecting through said opening, the damping element being formed with end lugs bearing against the casing.

7. A vibration insulator comprising a supporting element, a pair of disks having circular depressions therein placed back to back and riveted to the supporting element, a cylindrical rubber block seated in the circular depression of each disk, and a casing comprising two interengaging cupped members of sheet metal and of considerably larger diameter than said disks, said members being formed respectively with seats against which the outer ends of the blocks are seated, and being also secured together to hold the blocks under a predetermined normal compression, one of said members having an opening therein of considerably larger diameter than the supporting element through which said supporting element projects.

8. A vibration insulator comprising a casing formed interiorly with seats at opposite ends thereof, a damping element comprising a pair of rubber blocks respectively engaging said seats, each block being formed at its outer end with lugs bearing against said seats, a pair of oppositely cupped spacers in which the inner ends of the blocks are seated and a supporting element secured to the spacers and passing axially through one of the blocks and the casing, the latter being formed with an opening to clear the supporting element and also being peripherally spaced from the damping element.

GERHARD FLINTERMANN.